United States Patent
Aten

(10) Patent No.: US 9,903,313 B2
(45) Date of Patent: Feb. 27, 2018

(54) THRUST REVERSER WITH ONE OR MORE BUTRESSING CORNER CASCADE PORTIONS

(71) Applicant: Rohr, Inc., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 701 days.

(21) Appl. No.: 14/261,025

(22) Filed: Apr. 24, 2014

(65) Prior Publication Data
US 2015/0308378 A1   Oct. 29, 2015

(51) Int. Cl.
F02K 1/72   (2006.01)

(52) U.S. Cl.
CPC ............... *F02K 1/72* (2013.01); *Y02T 50/672* (2013.01)

(58) Field of Classification Search
CPC ..... F02K 1/68; F02K 1/70; F02K 1/72; Y02T 50/672
See application file for complete search history.

(56) References Cited

U.S. PATENT DOCUMENTS

| | | | |
|---|---|---|---|
| 3,794,246 | A | 2/1974 | Weise |
| 4,722,821 | A | 2/1988 | Vermilye |
| 4,852,805 | A | 8/1989 | Vermilye |
| 6,557,338 | B2 | 5/2003 | Holme et al. |
| 8,109,466 | B2 | 2/2012 | Aten et al. |
| 8,484,944 | B2 | 7/2013 | Urban et al. |
| 2003/0024236 | A1 | 2/2003 | Lymons et al. |
| 2004/0088858 | A1 | 5/2004 | Holme et al. |
| 2004/0159741 | A1* | 8/2004 | Sternberger ............... F02K 1/72 244/110 B |
| 2008/0271432 | A1* | 11/2008 | Tsou ........................ F02K 1/72 60/226.2 |
| 2009/0151320 | A1* | 6/2009 | Sternberger ............... F02K 1/72 60/226.2 |
| 2010/0126139 | A1* | 5/2010 | Howe .................... F02K 1/1207 60/226.2 |
| 2013/0092755 | A1* | 4/2013 | Aten ........................ F02K 1/72 239/265.33 |
| 2013/0327886 | A1 | 12/2013 | James | |

FOREIGN PATENT DOCUMENTS

| | | |
|---|---|---|
| CA | 2792065 | 4/2013 |
| EP | 2138697 | 12/2009 |
| EP | 2581593 | 4/2013 |

OTHER PUBLICATIONS

EP search report for EP15165007.4 dated Aug. 28, 2015.

* cited by examiner

*Primary Examiner* — Craig Kim
(74) *Attorney, Agent, or Firm* — O'Shea Getz P.C.

(57) ABSTRACT

A thrust reverser of a propulsion system nacelle is provided. The thrust reverser extends circumferentially about a lengthwise-extending centerline. The thrust reverser includes a lengthwise-extending upper track beam, a lengthwise-extending lower track beam, an annular torque box extending circumferentially between the upper and lower track beams, and an annular cascade array extending circumferentially between the upper and lower track beams. The cascade array is circumferentially segmented into a plurality of cascade portions. At least one of the plurality of cascade portions is made at least substantially of a material that permits the at least one cascade portion to bear high loads during both a forward thrust operation of the thrust reverser and a thrust reversing operation of the thrust reverser.

17 Claims, 7 Drawing Sheets

THRUST REVERSER WITH ONE OR MORE BUTRESSING CORNER CASCADE PORTIONS

BACKGROUND

1. Technical Field

Aspects of the present invention relate to a thrust reverser of a propulsion system nacelle, and more particularly relate to a thrust reverser having one or more buttressing corner cascade portions.

2. Background Information

It is known to provide a propulsion system that includes an engine (e.g., a gas turbine engine), a nacelle that at least partially surrounds the engine, and a pylon that connects the engine and the nacelle to a vehicle (e.g., an aircraft). In some instances, the thrust reverser includes a fixed structure and a translating structure that at least partially define an annular bypass airstream duct. The fixed structure includes an annular cascade array that is typically made at least substantially of a relatively lightweight composite material. The translating structure includes a translating sleeve and a plurality of blocker doors. The translating structure is selectively moveable relative to the fixed structure, between a stowed position (e.g., during a forward thrust operation) and a deployed position (e.g., during a thrust reversing operation). When the translating structure is in its stowed position, a bypass airstream can pass from a forward end of the bypass duct to an aft end of the bypass duct, through which it can be discharged to provide forward thrust. The translating sleeve and the blocker doors prevent the bypass airstream from passing through the cascade array. When the translating structure is moved from its stowed position to its deployed position, the translating sleeve moves relative to the fixed structure and the blocker doors are drawn down into the bypass duct, thereby exposing the cascade array to the bypass airstream and the ambient air surrounding the thrust reverser. The blocker doors redirect substantially all of the bypass airstream toward the cascade array, through which the bypass airstream can be discharged to generate reverse thrust.

In known thrust reverser designs, the cascade array bears high loads only during thrust reversing operations; the cascade array contributes little to the load bearing capabilities of the thrust reverser during forward thrust operations. Aspects of the present invention are directed to this and other problems.

SUMMARY OF ASPECTS OF THE INVENTION

According to an aspect of the present invention, a thrust reverser of a propulsion system nacelle is provided. The thrust reverser extends circumferentially about a lengthwise-extending centerline. The thrust reverser includes a lengthwise-extending upper track beam, a lengthwise-extending lower track beam, an annular torque box extending circumferentially between the upper and lower track beams, and an annular cascade array extending circumferentially between the upper and lower track beams. The cascade array is circumferentially segmented into a plurality of cascade portions. At least one of the plurality of cascade portions is made at least substantially of a material that permits the at least one cascade portion to bear high loads during both a forward thrust operation of the thrust reverser and a thrust reversing operation of the thrust reverser.

According to another aspect of the present invention, an annular cascade array for use in a thrust reverser of a propulsion system nacelle is provided. The thrust reverser extends circumferentially about a lengthwise-extending centerline. The thrust reverser includes lengthwise-extending upper and lower track beams and an annular cascade array extending circumferentially between the upper and lower track beams. The cascade array includes a plurality of a cascade portions extending circumferentially between the upper and lower track beams. At least one of the plurality of a cascade portions is made at least substantially of a material that permits the at least one cascade portion to bear high loads during both a forward thrust operation of the thrust reverser and a thrust reversing operation of the thrust reverser.

Additionally or alternatively, the present invention may include one or more of the following features individually or in combination:

the at least one cascade portion buttresses a connection between the torque box and the upper track beam;

the at least one cascade portion buttresses a connection between the torque box and the lower track beam;

the thrust reverser includes a fixed structure and a translating structure that at least partially define an annular airstream bypass duct there between; the translating structure is moveable relative to the fixed structure between a stowed position and a deployed position; the upper and lower track beams, the torque box, and the cascade array are included in the fixed structure; the translating structure prevent a bypass airstream passing through the bypass duct from discharging through the cascade array when the translating structure is in the stowed position; the cascade array is exposed to the bypass airstream and ambient air surrounding the propulsion system nacelle when the translating structure is in the deployed position; and the bypass airstream is discharged through the cascade array when the translating structure is in the deployed position;

at least one of the plurality of cascade portions includes a plurality of vanes that are configured to redirect the bypass airstream to generate reverse thrust as the bypass airstream is discharged through the cascade array;

the cascade array is circumferentially segmented into left and right sides that each extend circumferentially between respective top and bottom ends; and the respective top ends of the left and right side portions of the cascade array are connected to the upper track beam;

the plurality of cascade portions include: a first corner cascade portion disposed adjacent to and connected to the upper track beam; a second corner cascade portion disposed adjacent to and connected to the lower track beam; an intermediate cascade portion disposed circumferentially between the first and second corner cascade portions; the first and second corner cascade portions are made at least substantially of a first material that permits the first and second corner cascade portions to bear high loads during both a forward thrust operation of the thrust reverser and a thrust reversing operation of the thrust reverser; and the intermediate corner cascade portion is made at least substantially of a second material that permits the intermediate cascade portion to bear high loads only during a thrust reversing operation of the thrust reverser;

forward ends of the first and second corner cascade portions are connected to the torque box; and a forward end of the intermediate cascade portion abuts the torque box but is not connected to the torque box;

the thrust reverser further includes: an annular aft cascade ring that extends circumferentially between the upper track beam and the lower track beam; the cascade array extends in a lengthwise direction between the torque box and the aft cascade ring; at least one of the first and second corner cascade portions includes an aft cascade ring fitting integrally formed therewith; and the aft cascade ring fitting permits connection of the at least one of the first and second corner cascade portions with the aft cascade ring; and the plurality of cascade portions includes: a first corner cascade portion disposed adjacent to and connected to the upper track beam; a second corner cascade portion disposed adjacent to the first corner cascade portion; a third corner cascade portion disposed adjacent to and connected to the lower track beam; a fourth corner cascade portion disposed adjacent to the third corner cascade portion; an intermediate cascade portion disposed circumferentially between the second and third corner cascade portions; the first, second, third, and fourth corner cascade portions are made at least substantially of a first material that permits the first, second, third, and fourth corner cascade portions to bear high loads during both a forward thrust operation of the thrust reverser and a thrust reversing operation of the thrust reverser; and the intermediate corner cascade portion is made at least substantially of a second material that permits the intermediate cascade portion to bear high loads only during a thrust reversing operation of the thrust reverser.

These and other aspects of the present invention will become apparent in light of the drawings and detailed description provided below.

DETAILED DESCRIPTION OF ASPECTS OF THE INVENTION

Figure 1:
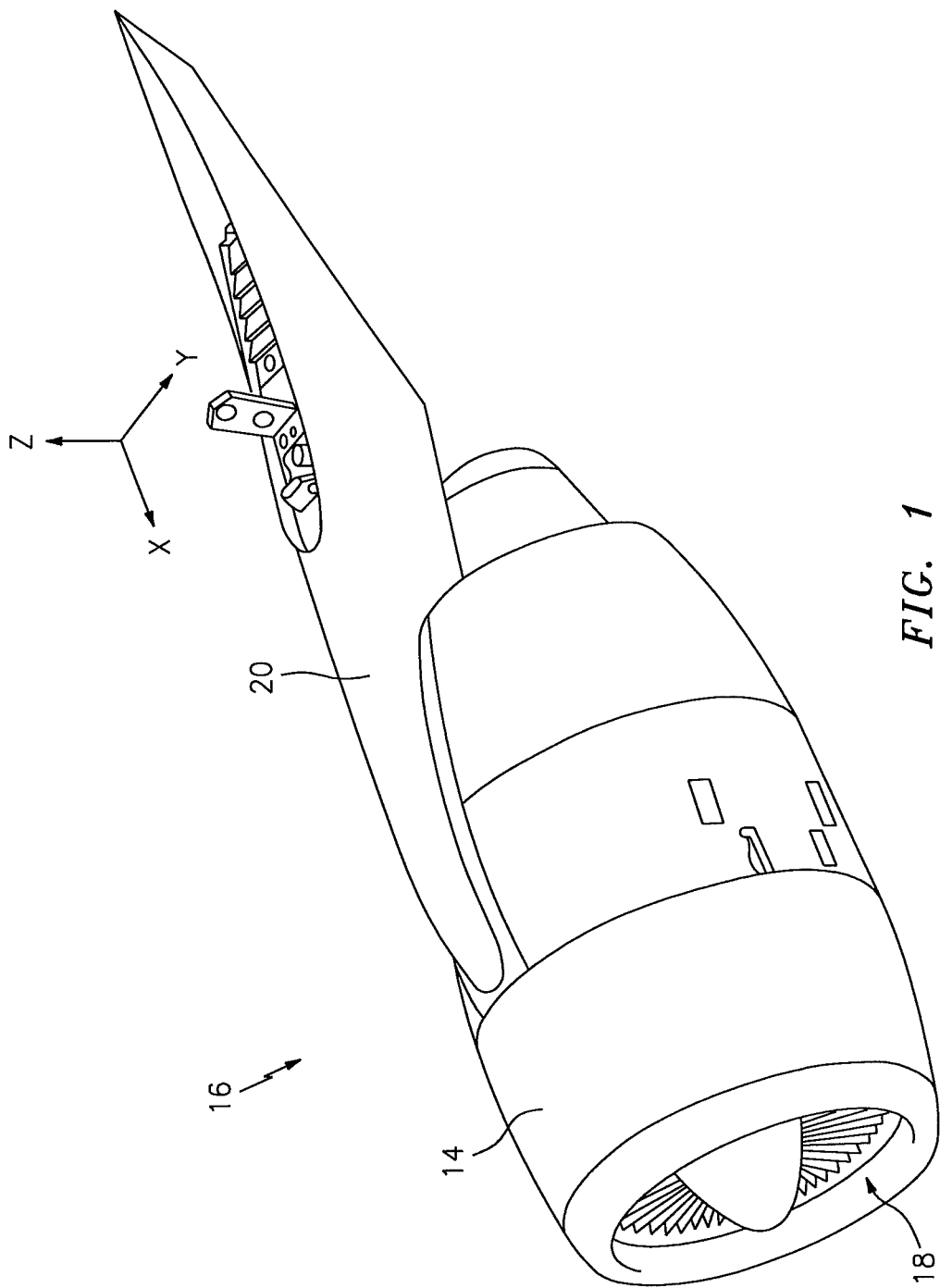
FIG. 1 is a perspective view of a propulsion system.

The present disclosure describes embodiments of a cascade array 10 (see FIGS. 3-7) that includes one or more buttressing corner cascade portions, and embodiments of a thrust reverser 12 (see FIGS. 2-4) that includes the cascade array 10.

The present disclosure describes aspects of the present invention with reference to the exemplary embodiments illustrated in the drawings; however, aspects of the present invention are not limited to the exemplary embodiments illustrated in the drawings. The present disclosure may describe one or more features as having a length extending relative to an x-axis, a width extending relative to a y-axis, and/or a height extending relative to a z-axis. The drawings illustrate the respective axes.

The present disclosure uses the terms "circumferential," "annular," "abut," and variations thereof, to describe one or more features. The term "circumferential," and variations thereof, are used herein to indicate that a feature extends along a curve that is centered about an axis of rotation. The term "annular," and variations thereof, are used herein to indicate that a feature is at least partially in the form of a ring (e.g., a ring in a circular shape or another shape). The term "abut," and variations thereof, are used herein to indicate either that a first feature is in direct contact with a second feature, or that a first feature is almost in direct contact with a second feature and is separated from the second feature only by one or more small gaps.

Figure 2:
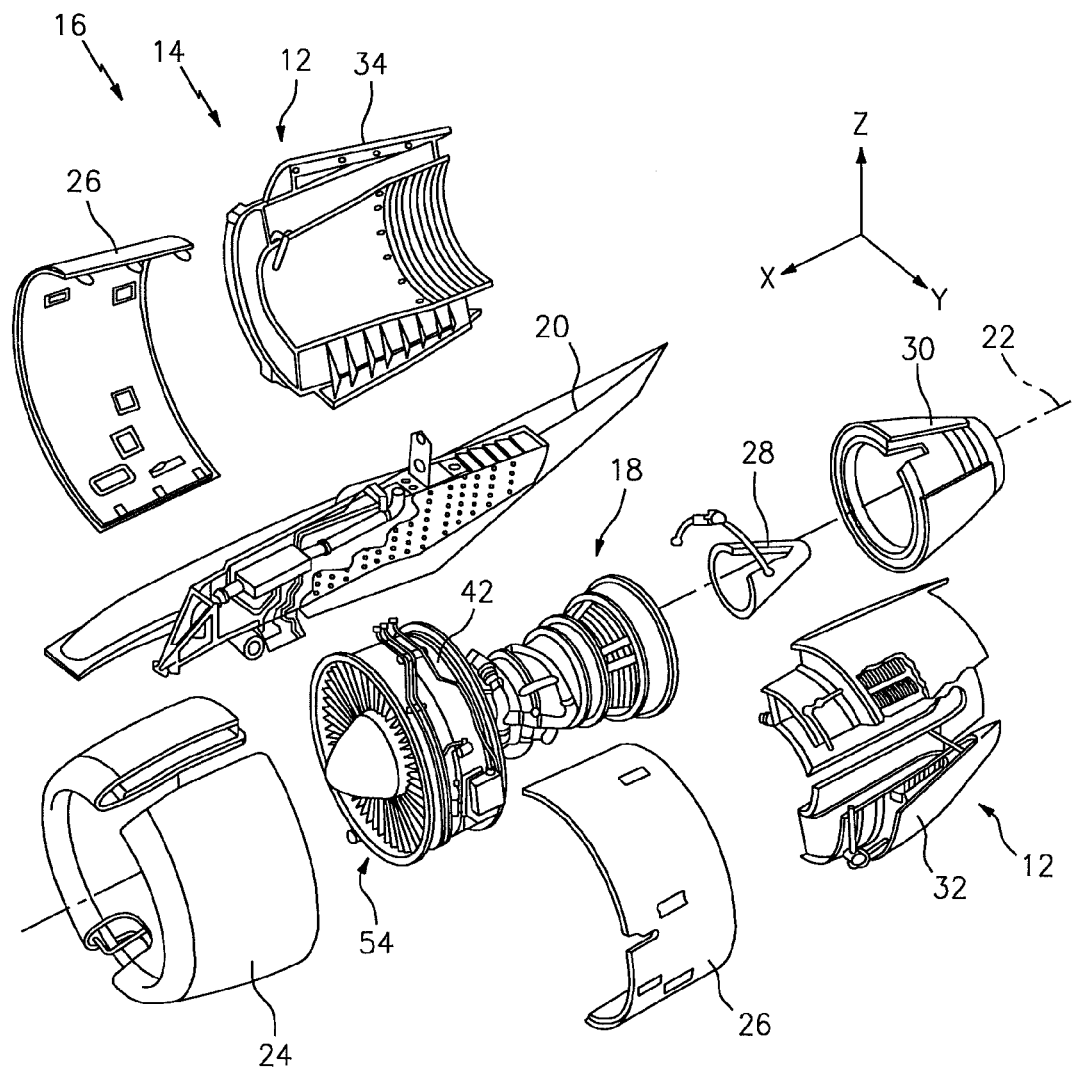
FIG. 2 is an exploded perspective view of the propulsion system of FIG. 1.

Referring to FIG. 1, the cascade array 10 (see FIGS. 3-7) is included in a nacelle 14, and the nacelle 14 is included in a propulsion system 16. The propulsion system 16 and the nacelle 14 can be configured in various different ways. In the illustrated embodiment, the propulsion system 16 is a turbofan-type propulsion system that includes the nacelle 14, a gas turbine engine 18, and a pylon 20. Referring to FIG. 2, the nacelle 14 and the gas turbine engine 18 extend circumferentially about a lengthwise-extending centerline 22, and extend in a lengthwise direction between respective forward and aft ends. The nacelle 14 partially surrounds the gas turbine engine 18. The pylon 20 connects the nacelle 14 and the gas turbine engine 18 to the underside of an aircraft wing (not shown). The nacelle 14 includes an inlet 24, a fan cowl 26, a thrust reverser 12, an exhaust centerbody 28, and an exhaust nozzle 30. The cascade array 10 (see FIGS. 3-7) is included in the thrust reverser 12 portion of the nacelle 14.

Figure 3:
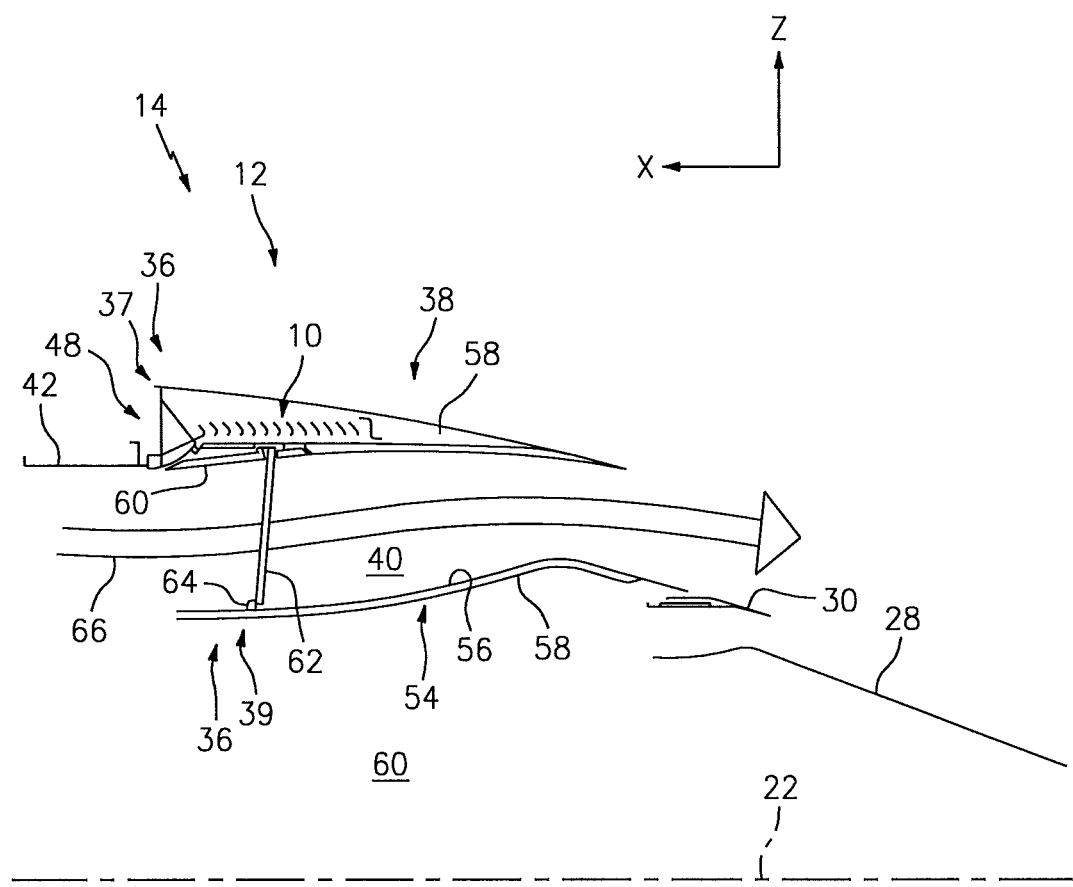
FIG. 3 is a sectional schematic view of the thruster reverser, the exhaust centerbody, and the exhaust nozzle portions of the nacelle that are included in the propulsion system of FIG. 1.
Figure 4:
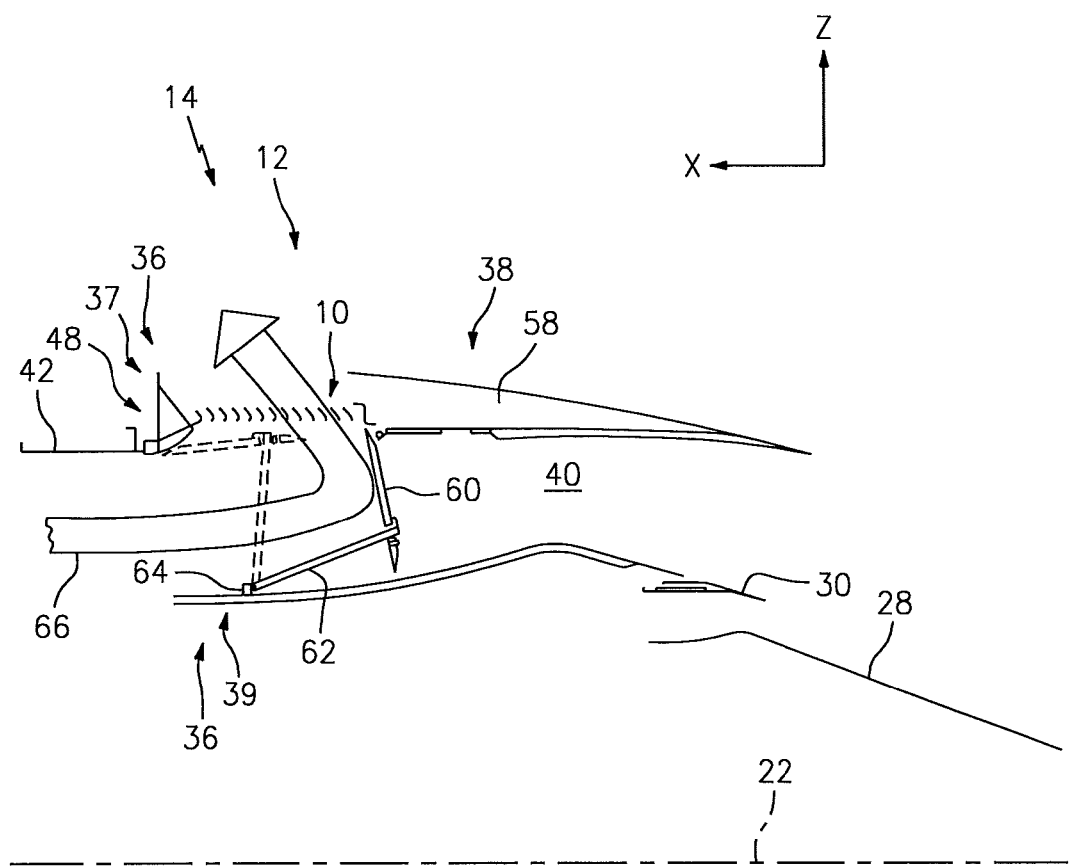
FIG. 4 is a sectional schematic view of the thruster reverser, the exhaust centerbody, and the exhaust nozzle portions of the nacelle that are included in the propulsion system of FIG. 1.

Referring to FIG. 2, in the illustrated embodiment the thrust reverser 12 is a cascade-type thrust reverser that is circumferentially segmented into a left side portion 32 and a right side portion 34. Referring to FIGS. 3 and 4, the thrust reverser 12 includes a fixed structure 36 and a translating structure 38. The fixed structure 36 and the translating structure 38 partially define an annular bypass duct 40. FIGS. 3 and 4 illustrate the relative positioning of the fixed structure 36 and the translating structure 38 portions of the thrust reverser 12, as well as the fan case 42 that surrounds the fan section 54 of the gas turbine engine 18, the exhaust centerbody 28, and the exhaust nozzle 30 portions of the nacelle 14.

Figure 5:
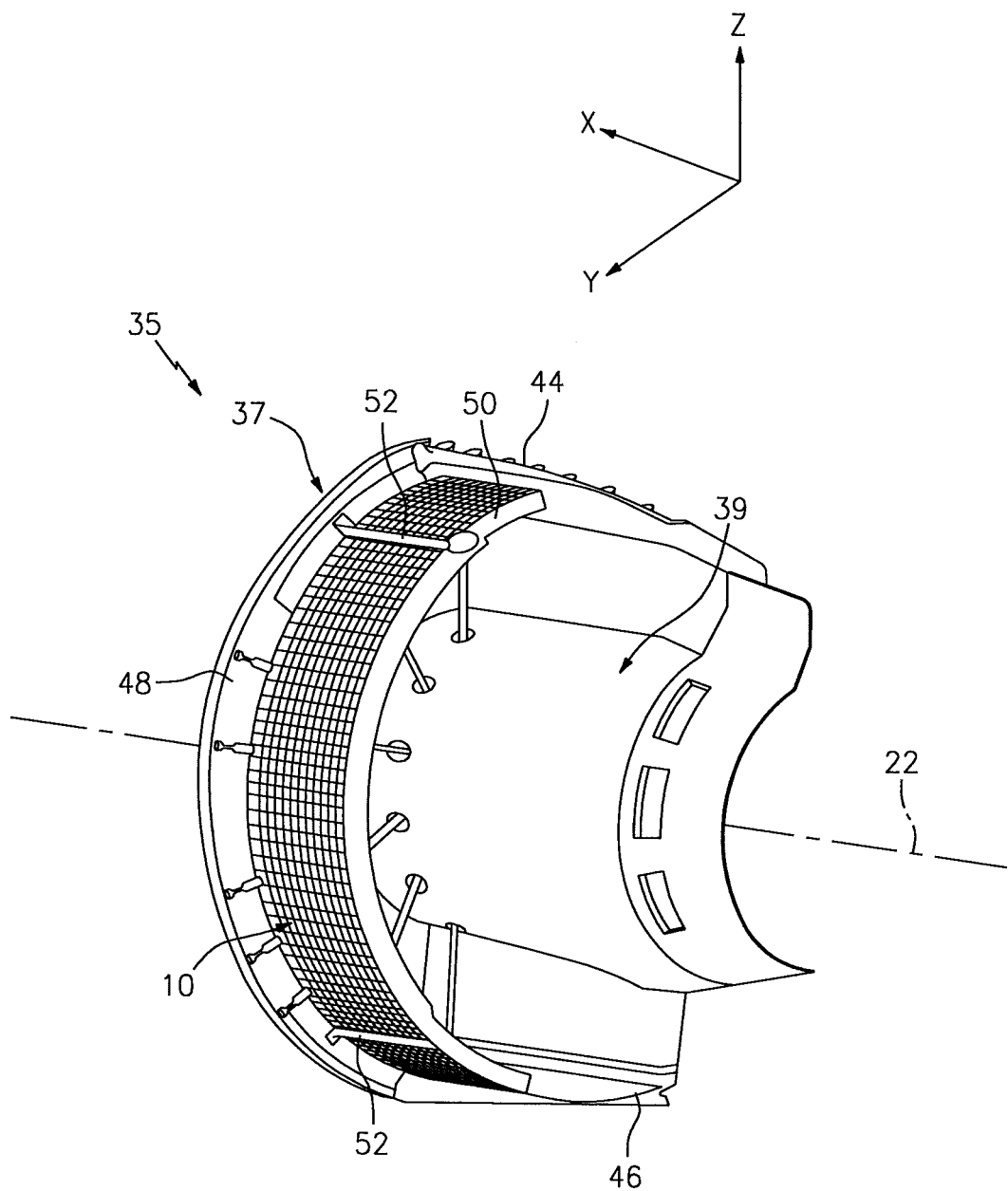
FIG. 5 is a partial perspective view of the outer fixed structure portion of the thrust reverser of FIGS. 3 and 4.

Referring to FIGS. 3-5, the fixed structure 36 includes a radially outer fixed structure 37 and a radially inner fixed structure 39. The outer fixed structure 37 includes an upper track beam 44 (see FIG. 5), a lower track beam 46 (see FIG. 5), an annular torque box 48, the cascade array 10, an annular aft cascade ring 50 (see FIG. 5), and a plurality of actuators 52 (see FIG. 5). Referring to FIG. 5, the upper and lower track beams 44, 46 extend in generally lengthwise directions along upper and lower areas of the outer fixed structure 37, respectively. The torque box 48 extends circumferentially between the upper and lower track beams 44, 46 (see FIG. 5). A forward end of the torque box 48 is connected to an aft end of the fan case 42 (see FIGS. 3 and 4). The cascade array 10 and the aft cascade ring 50 extend circumferentially between the upper and lower track beams 44, 46. The cascade array 10 extends in a generally lengthwise direction between the torque box 48 and the aft cascade ring 50. The actuators 52 extend in a generally lengthwise direction between the torque box 48 and the translating structure 38 (see FIGS. 3 and 4). The actuators 52 are operable to move the translating structure 38 (see FIGS. 3 and 4) relative to the outer fixed structure 37, as will be described below. The relative positioning of the upper and lower track beams 44, 46 (see FIG. 5), the torque box 48, the cascade array 10, the aft cascade ring 50, and the actuators 52 will also be described in detail below relative to FIG. 6.

Referring to FIGS. 3 and 4, the translating structure 38 includes an annular translating sleeve 58, a plurality of blocker doors 60, and a plurality of drag links 62. The translating structure 38 is selectively moveable (e.g., using one or more actuators) in a generally lengthwise direction relative to the fixed structure 36, between a stowed position (see FIG. 3) (e.g., during a forward thrust operation) and a deployed position (see FIG. 4) (e.g., during a thrust reversing operation). The translating sleeve 58 slidably engages the upper and lower track beams 44, 46 (see FIG. 5) of the outer fixed structure 37. Each of the blocker doors 60 extends between a forward edge and an aft edge. The forward edge of each blocker door 60 slidably engages the outer fixed structure 37 of the thrust reverser 12, and the aft edge of each blocker door 60 is pivotably connected to a drag link 62, as will be described below. Each of the drag links 62 includes a radially outer end portion and a radially inner end portion. The outer end portion of each drag link 62 is pivotably connected to an aft end of a blocker door 60, and the inner end portion of each drag link 62 is pivotably connected to a drag link fitting 64 that is positionally fixed relative to the inner fixed structure 39 of the thrust reverser 12.

The translating sleeve 58, the blocker doors 60, and the drag links 62 of the the translating structure 38 are selectively moveable between respective stowed positions (see FIG. 3) (e.g., during a forward thrust operation) and respective deployed positions (see FIG. 4) (e.g., during a thrust reversing operation). The translating sleeve 58, the blocker doors 60, and the drag links 62 are configured to be in their respective stowed positions (see FIG. 3) when the translating structure 38 is in its stowed position (see FIG. 3), and are configured to be in their respective deployed position (see FIG. 4) when the translating structure 38 is in its deployed position (see FIG. 4).

Referring back to FIG. 2, during operation of the illustrated propulsion system 16, an airstream (not shown) enters the gas turbine engine 18 through the fan section 54 of the gas turbine engine 18, and the airstream is thereafter divided into at least a core airstream (not shown) and a bypass airstream 66 (see FIGS. 3 and 4). The core airstream enters the gas turbine engine 18, where it is accelerated. The core airstream is then discharged through the aft end of the gas turbine engine 18, and it is then finally discharged through the exhaust nozzle 30 portion of the nacelle 14 to provide forward thrust.

Referring again to FIGS. 3 and 4, when the translating structure 38 is in its stowed position (see FIG. 3), the bypass airstream 66 can pass from a forward end of the bypass duct 40 to an aft end of the bypass duct 40, through which it can be discharged to provide forward thrust. The translating sleeve 58 and the blocker doors 60 of the translating structure 38 prevent the bypass airstream 66 from passing through the cascade array 10 included in the outer fixed structure 37 of the thrust reverser 12. The drag links 62 each block only a small circumferential portion of the bypass duct 40, and thus the bypass airstream 66 can pass around them relatively easily.

When the translating structure 38 is in its deployed position (see FIG. 4), the cascade array 10 is exposed to the bypass airstream 66 passing through the bypass duct 40, and is exposed to ambient air surrounding the nacelle 14. The blocker doors 60 are positioned within the bypass duct 40 to thereby redirect substantially all of the bypass airstream 66 toward the cascade array 10, through which the bypass airstream 66 can be discharged to generate reverse thrust.

Figure 6:
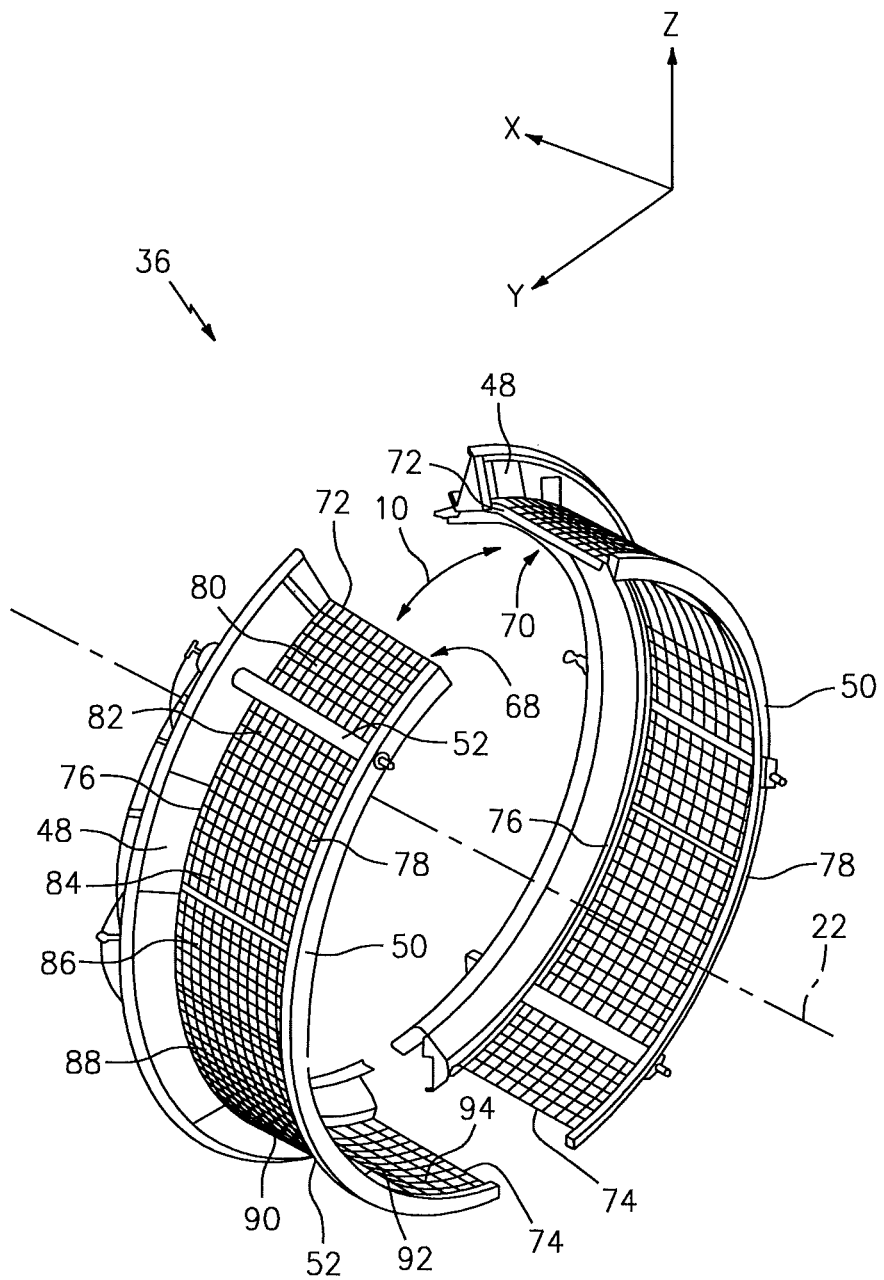
FIG. 6 is a partial perspective view of the outer fixed structure portion of the thrust reverser of FIGS. 3 and 4.

Referring to FIG. 6, the cascade array 10 is an annular structure that is circumferentially segmented into a left side portion 68 and a right side portion 70. The left and right side portions 68, 70 of the cascade array 10 each extend circumferentially between a top end 72 and a bottom end 74, and extend in a generally lengthwise direction between a forward end 76 and an aft end 78. As will be described below, one or more of the top ends 72 of the left and right side portions 68, 70 of the cascade array 10 are connected (e.g., using overlapping flanges) to the upper track beam 44 (see FIG. 5), and one or more of the bottom ends 74 are connected (e.g., using overlapping flanges) to the lower track beam 46 (see FIG. 5). The forward ends 76 of the left and right side portions 68, 70 of the cascade array 10 are connected to the toque box 56, and the aft ends are connected to the aft cascade ring 50.

The cascade array 10 is circumferentially segmented into a plurality of cascade portions. The number of cascade portions can vary (e.g., based on the size of the nacelle 14). Referring to FIG. 6, in the illustrated embodiment the left and right side portions 68, 70 of the cascade array 10 each include eight (8) cascade portions. For example, the left side portion 68 of the cascade array 10 includes a first cascade portion 80, a second cascade portion 82, a third cascade portion 84, a fourth cascade portion 86, a fifth cascade portion 88, a sixth cascade portion 90, a seventh cascade portion 92, and an eighth cascade portion 94.

In the illustrated embodiment, each of the cascade portions includes a plurality of vanes that are configured to redirect the bypass airstream 66 to generate reverse thrust as the bypass airstream 66 is discharged through the cascade array 10 during a thrust reversing operation. In other embodiments not shown in the drawings, at least one of the cascade portions is "blank". That is, at least one of the cascade portions can exclude vanes, and instead can be configured as a circumferentially-extending plate that can prevent flow of the bypass airstream 66 through the respective cascade portion during a thrust reversing operation. The use of such "blank" cascade portions is described, for example, in U.S. Patent Publication No. 2013/0327886.

The cascade portions can circumferentially abut one another, or they can be circumferentially separated by one or more of the actuators 52 of the outer fixed structure 37. Referring to FIG. 6, in the illustrated embodiment an actuator 52 is disposed circumferentially between the first and second cascade portions 80, 82, and an actuator 52 (hidden from view in FIG. 6) is disposed circumferentially between the seventh and eighth cascade portions 92, 94. In the illustrated embodiment, the aft cascade ring 50 includes a plurality of lengthwise extending apertures through which the actuators 52 extend to permit connect of the actuators 52 with the translating structure 38 of the thrust reverser 12 (see FIGS. 3 and 4).

Referring still to FIG. 6, the cascade portions of the cascade array 10 include corner cascade portions and intermediate cascade portions. The corner cascade portions are those cascade portions that are connected to the upper and lower track beams 44, 46 (see FIG. 5) of the outer fixed structure 37 of the thrust reverser 12. In some embodiments, including the illustrated embodiment, the corner cascade portions further include one or more cascade portions that are circumferentially adjacent to a cascade portion that is attached to the upper or lower track beams 44, 46 (see FIG. 5). The intermediate cascade portions are positioned circumferentially between the cascade portions proximate the upper track beam 44 (see FIG. 5) and the cascade portions proximate the lower track beam 46 (see FIG. 5). In the illustrated embodiment, the left side portion 68 of the cascade array 10 includes four (4) corner cascade portions (i.e., the first, second, seventh, and eighth cascade portions 80, 82, 92, 94) and four (4) intermediate cascade portions (i.e., the third, fourth, fifth, and sixth cascade portions 84, 86, 88, 90). In other embodiments not shown in the drawings, the left side portion 68 of the cascade array 10 can include only two (2) corner cascade portions (i.e., the first and eighth cascade portions 80, 94) and six (6) intermediate cascade portions (i.e., the third, fourth, fifth, and sixth cascade portions 82, 84, 86, 88, 90, 92).

One or more of the corner cascade portions (e.g., the first, second, seventh, and eighth cascade portions 80, 82, 92, 94) are made at least substantially of one or more materials (e.g., one or more metal materials) that permit those corner cascade portions to bear high loads during both forward thrust operations and thrust reversing operations. Those corner cascade portions will be referred to hereinafter as "buttressing corner cascade portions," for reasons that will be described below. One example of an acceptable material for the buttressing corner cascade portions is investment cast aluminum. All other corner cascade portions will be referred to hereinafter as "non-buttressing corner cascade portions." In the illustrated embodiment, all of the corner cascade portions (e.g., the first, second, seventh, and eighth cascade portions 80, 82, 92, 94) are buttressing corner cascade portions. The non-buttressing corner cascade portions (not included in the illustrated embodiment) and the intermediate cascade portions (e.g., the third, fourth, fifth, and sixth cascade portions 84, 86, 88, 90) are made at least substantially of one or more materials that permit those cascade portions to bear high loads only during thrust reversing operations. One example of an acceptable material for the non-buttressing corner cascade portions is a composite material.

Figure 7:
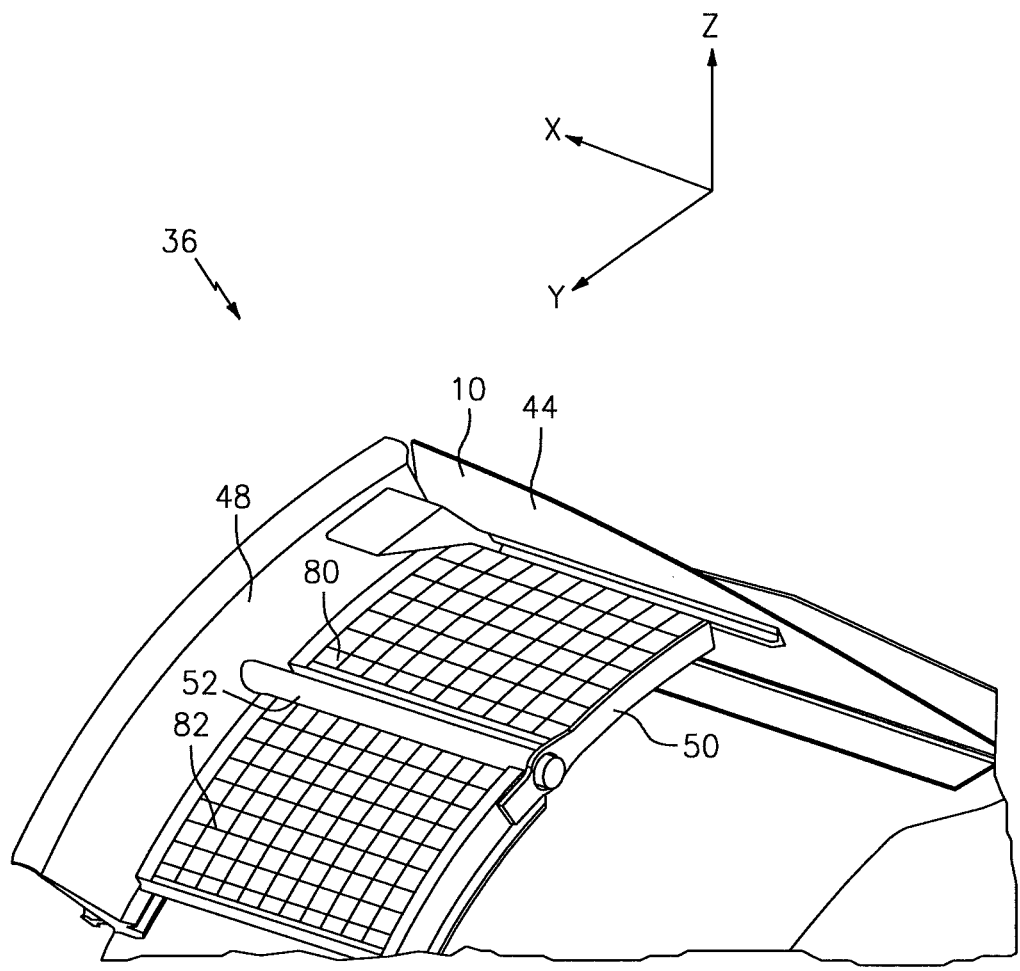
FIG. 7 is a partial perspective view of the outer fixed structure portion of the thrust reverser of FIGS. 3 and 4.

The forward ends of the buttressing corner cascade portions (e.g., the first, second, seventh, and eighth cascade portions 80, 82, 92, 94) are connected to the torque box 48. In contrast, the forward ends of the non-buttressing corner cascade portions (not included in the illustrated embodiment), and the forward ends of the intermediate cascade portions (e.g., the third, fourth, fifth, and sixth cascade portions 84, 86, 88, 90), abut the torque box 48, but are not connected to the torque box 48. The buttressing corner cascade portions that are disposed adjacent to the upper and lower track beams 44, 46 (e.g., the first and eighth cascade portions 80, 94) are also connected to the upper and lower track beams 44, 46, respectively. FIG. 7 illustrates the relative positioning of the first and second cascade portions 80, 82, the actuator 52 disposed circumferentially between the first and second cascade portions 80, 82, the torque box 48, the aft cascade ring 50, and the upper track beam 44. Notably, the first and second cascade portions 80, 82 (being buttressing corner cascade portions) are connected to both the torque box 48, and the first cascade portion 80 (being disposed adjacent to the upper track beam 44) is connected to the upper track beam 44.

Referring again to FIG. 6, in the illustrated embodiment the aft ends of the buttressing corner cascade portions (e.g., the first, second, seventh, and eighth cascade portions 80, 82, 92, 94), can include one or more aft cascade ring fittings (not shown) integrally formed therewith. The aft cascade ring fittings permit connection of the respective corner cascade portions with the aft cascade ring 50. The aft ends of the non-buttressing corner cascade portions (not included in the illustrated embodiment) and the aft ends of the intermediate cascade portions (e.g., the third, fourth, fifth, and sixth cascade portions 84, 86, 88, 90), do not include one or more aft cascade ring fittings (not shown) integrally formed therewith. Instead, the aft cascade ring fittings are separate components that are connected to the aft ends of those cascade portions during manufacturing.

The present cascade array 10 offers several significant advantages.

First, the buttressing corner cascade portions of the cascade array 10 buttress the connections of the torque box 48 with the upper and lower track beams 44, 46. This enables the cascade array 10 to bear high loads during both forward thrust operations and thrust reversing operations. The loads experienced by the cascade array 10 include lengthwise-extending loads (i.e., "axial" loads), radially-extending loads, and circumferentially-extending loads (i.e., "hoop" loads).

Second, the buttressing corner cascade portions of the cascade array 10 enable loads to be distributed over a larger area of the thrust reverser 12. In previous thrust reverser designs, the thrust reverser typically had a small cross-sectional area, which provided a small "attachment footprint" for the connections of the torque box with the upper and lower track beams. As a result of this small "attachment footprint," the area proximate the connections of the torque box with the upper and lower track beams could be an area of concentrated loads. In the present thrust reverser 12, the buttressing corner cascade portions of the cascade array 10 have the effect of increasing the size of the "attachment footprint," which in turn enable loads to be distributed over a larger area of the thrust reverser 12.

Second, although the inclusion of the buttressing corner cascade portions can increase the weight of the cascade array 10, the above-described buttressing feature of the cascade array 10 allows for a reduction in the size and weight of the torque box 48 and the upper and lower track beams 44, 46. Due to loft line constraints, the size of the torque box 48 and the upper and lower track beams 44, 46 can be a significant factor in the design of the thrust reverser 12.

Third, because the buttressing corner cascade portions can be made at least substantially of, for example, investment cast aluminum, the aft cascade ring fittings can be integrally formed therewith relatively easily. In contrast, it can be relatively difficult and/or expensive to integrally form aft cascade ring fittings with a cascade portion (e.g., a non-buttressing corner cascade portion or an intermediate cascade portion) that is made at least substantially of, for example, a composite material. This feature of the cascade array 10 thus reduces the number of separate parts included in the thrust reverser 12, and facilitates the manufacturing and packaging of the thrust reverser 12.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A thrust reverser of a propulsion system nacelle, the thrust reverser extending circumferentially about a lengthwise-extending centerline, the thrust reverser comprising:
   a lengthwise-extending upper track beam;
   a lengthwise-extending lower track beam;
   an annular torque box extending circumferentially between the upper and lower track beams;
   an annular cascade array extending circumferentially between the upper and lower track beams;
   wherein the cascade array is circumferentially segmented into a plurality of cascade portions comprising a corner cascade portion and an intermediate cascade portion;
   wherein the corner cascade portion is made at least substantially of a first material that permits the corner cascade portion to bear loads during both a forward thrust operation of the thrust reverser and a thrust reversing operation of the thrust reverser; and
   wherein the intermediate cascade portion is made at least substantially of a second material that is different than the first material.

2. The thrust reverser of claim 1, wherein the corner cascade portion buttresses a connection between the torque box and the upper track beam.

3. The thrust reverser of claim 1, wherein the corner cascade portion buttresses a connection between the torque box and the lower track beam.

4. The thrust reverser of claim 1, wherein the thrust reverser includes a fixed structure and a translating structure that at least partially define an annular airstream bypass duct there between;
   wherein the translating structure is moveable relative to the fixed structure between a stowed position and a deployed position;
   wherein the upper and lower track beams, the torque box, and the cascade array are included in the fixed structure;
   wherein the translating structure prevent a bypass airstream passing through the bypass duct from discharging through the cascade array when the translating structure is in the stowed position;
   wherein the cascade array is exposed to the bypass airstream and ambient air surrounding the propulsion system nacelle when the translating structure is in the deployed position; and
   wherein the bypass airstream is discharged through the cascade array when the translating structure is in the deployed position.

5. The thrust reverser of claim 1, wherein at least one of the plurality of cascade portions includes a plurality of vanes that are configured to redirect the bypass airstream to generate reverse thrust as the bypass airstream is discharged through the cascade array.

6. The thrust reverser of claim 1, wherein the cascade array is circumferentially segmented into left and right sides that each extend circumferentially between respective top and bottom ends; and
   wherein the respective top ends of the left and right side portions of the cascade array are connected to the upper track beam.

7. The thrust reverser of claim 1, wherein the plurality of cascade portions includes:
   a first corner cascade portion disposed adjacent to and connected to the upper track beam;
   a second corner cascade portion disposed adjacent to the first corner cascade portion;
   a third corner cascade portion disposed adjacent to and connected to the lower track beam; and
   a fourth corner cascade portion disposed adjacent to the third corner cascade portion;
   wherein the intermediate cascade portion is disposed circumferentially between the second and third corner cascade portions;
   wherein the first, second, third, and fourth corner cascade portions are made at least substantially of the first material that permits the first, second, third, and fourth corner cascade portions to bear loads during both a forward thrust operation of the thrust reverser and a thrust reversing operation of the thrust reverser;
   wherein the intermediate corner cascade portion is made at least substantially of the second material that permits the intermediate cascade portion to bear loads during a thrust reversing operation of the thrust reverser; and
   the corner cascade portion comprises one of the first, second, third, and fourth corner cascade portions.

8. The thrust reverser of claim 1, wherein the first material is metal and the second material is composite material.

9. The thrust reverser of claim 1, wherein the corner cascade portion is made completely of the first material that consists essentially of metal, and the second material comprises composite material.

10. The thrust reverser of claim 1, wherein the corner cascade portion is circumferential next to and connected to the at least another one of the plurality of cascade portions.

11. The thrust reverser of claim 1, further comprising:
    a first aft cascade ring fitting integrally formed with the corner cascade portion;
    a second aft cascade ring fitting formed discrete from and attached to the intermediate cascade portion; and
    an annular aft cascade ring that extends circumferentially between the upper track beam and the lower track beam, wherein the annular aft cascade ring is connected to the corner cascade portion through the first aft cascade ring fitting, and wherein the annular aft cascade ring is connected to the intermediate cascade portion through the second aft cascade ring fitting.

12. The thrust reverser of claim 11, wherein the first material is metal and the second material is composite material.

13. A thrust reverser of a propulsion system nacelle, the thrust reverser extending circumferentially about a lengthwise-extending centerline, the thrust reverser comprising:
    a lengthwise-extending upper track beam;
    a lengthwise-extending lower track beam;
    an annular torque box extending circumferentially between the upper and lower track beams;
    an annular cascade array extending circumferentially between the upper and lower track beams;
    wherein the cascade array is circumferentially segmented into a plurality of cascade portions;
    wherein at least one of the plurality of cascade portions is made at least substantially of a material that permits the at least one cascade portion to bear loads during both a forward thrust operation of the thrust reverser and a thrust reversing operation of the thrust reverser;
    wherein the plurality of cascade portions include:
       a first corner cascade portion disposed adjacent to and connected to the upper track beam;
       a second corner cascade portion disposed adjacent to and connected to the lower track beam;

an intermediate cascade portion disposed circumferentially between the first and second corner cascade portions;

wherein the first and second corner cascade portions are made at least substantially of a first material that permits the first and second corner cascade portions to bear loads during both a forward thrust operation of the thrust reverser and a thrust reversing operation of the thrust reverser; and wherein the intermediate corner cascade portion is made at least substantially of a second material that permits the intermediate cascade portion to bear loads during a thrust reversing operation of the thrust reverser.

14. The thrust reverser of claim 13, wherein forward ends of the first and second corner cascade portions are connected to the torque box; and wherein a forward end of the intermediate cascade portion abuts the torque box but is not connected to the torque box.

15. The thrust reverser of claim 13, further comprising:

an annular aft cascade ring that extends circumferentially between the upper track beam and the lower track beam;

wherein the cascade array extends in a lengthwise direction between the torque box and the aft cascade ring;

wherein at least one of the first and second corner cascade portions includes an aft cascade ring fitting integrally formed therewith; and wherein the aft cascade ring fitting permits connection of the at least one of the first and second corner cascade portions with the aft cascade ring.

16. An annular cascade array for use in a thrust reverser of a propulsion system nacelle, the thrust reverser extending circumferentially about a lengthwise-extending centerline, the thrust reverser including lengthwise-extending upper and lower track beams and an annular cascade array extending circumferentially between the upper and lower track beams, the cascade array comprising:

a plurality of cascade portions extending circumferentially between the upper and lower track beams, the cascade portion comprising a corner cascade portion and an intermediate cascade portion;

wherein the corner cascade portion is made at least substantially of a first material that permits the first of the cascade portions to bear loads during both a forward thrust operation of the propulsion system and a thrust reversing operation of the thrust reverser; and wherein the intermediate cascade portion is made at least substantially of a second material that is different from the first material.

17. The cascade array of claim 16, wherein the first material is metal and the second material is composite material.

* * * * *